(12) United States Patent
Ding et al.

(10) Patent No.: US 11,178,448 B2
(45) Date of Patent: Nov. 16, 2021

(54) METHOD, APPARATUS FOR PROCESSING VIDEO, ELECTRONIC DEVICE AND COMPUTER-READABLE STORAGE MEDIUM

(71) Applicant: BEIJING MICROLIVE VISION TECHNOLOGY CO., LTD, Beijing (CN)

(72) Inventors: Li Ding, Beijing (CN); Yingyi Xu, Beijing (CN)

(73) Assignee: BEIJING MICROLIVE VISION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/009,131

(22) Filed: Sep. 1, 2020

(65) Prior Publication Data

US 2020/0396496 A1 Dec. 17, 2020

Related U.S. Application Data

(63) Continuation of application No. PCT/CN2018/125404, filed on Dec. 29, 2018.

(30) Foreign Application Priority Data

Dec. 26, 2018 (CN) .......................... 201811605064.9

(51) Int. Cl.
*H04N 21/431* (2011.01)
*H04N 21/2187* (2011.01)
*H04N 21/485* (2011.01)

(52) U.S. Cl.
CPC ..... *H04N 21/4312* (2013.01); *H04N 21/2187* (2013.01); *H04N 21/4858* (2013.01)

(58) Field of Classification Search
None
See application file for complete search history.

(56) References Cited

U.S. PATENT DOCUMENTS 7,853,972 B2 * 12/2010 Brodersen .......... H04N 7/17318
725/40
8,843,401 B2 * 9/2014 Gromek ................ G06F 3/0482
705/27.1

(Continued)

FOREIGN PATENT DOCUMENTS

CN 102314496 A 1/2012
CN 103634686 A 3/2014

(Continued)

OTHER PUBLICATIONS

International Patent Application No. PCT/CN2018/125404; International Search Report; dated Sep. 16, 2019; 3 pages.

*Primary Examiner* — Alexander Q Huerta
(74) *Attorney, Agent, or Firm* — BakerHostetler (57) ABSTRACT

Embodiments of the present disclosure provide a method, an apparatus for processing video, an electronic device, and a computer-readable storage medium. The method includes: transmitting a request for acquiring a video to a server when current display information in a user interaction interface is preview information of the video, wherein, the request for acquiring the video comprises identification information of the video; receiving video information corresponding to the video pushed by the server based on the request for acquiring the video; and displaying the video information through a video preview window, wherein the video preview window is suspended above the user interaction interface. According to the embodiments of the present disclosure, the user can preview video information corresponding to respective video through a video preview window in the user interaction interface, that is, the user can directly select a video of (Continued)

interest by using the video information displayed in the video preview window, without entering the video playing screen, which improves the user's interactive experience.

14 Claims, 5 Drawing Sheets

(56) References Cited

U.S. PATENT DOCUMENTS

| | | | |
|---|---|---|---|
| 9,762,971 B1* | 9/2017 | Dodge | H04L 67/02 |
| 2007/0136750 A1* | 6/2007 | Abanami | H04N 21/47205 |
| | | | 725/44 |
| 2012/0081267 A1 | 4/2012 | Sirpal et al. | |
| 2013/0080895 A1* | 3/2013 | Rossman | G06F 3/04883 |
| | | | 715/720 |
| 2015/0074721 A1* | 3/2015 | Fishman | H04N 21/4312 |
| | | | 725/45 |
| 2015/0288884 A1 | 10/2015 | Kim | |
| 2016/0080817 A1* | 3/2016 | Chai | G06F 3/0482 |
| | | | 725/43 |
| 2016/0370982 A1* | 12/2016 | Penha | G06F 3/04817 |
| 2018/0192142 A1* | 7/2018 | Paul | H04N 21/41407 |
| 2018/0255341 A1* | 9/2018 | Deng | H04N 21/4722 |
| 2019/0163336 A1* | 5/2019 | Yu | H04N 21/44008 |

FOREIGN PATENT DOCUMENTS

| | | |
|---|---|---|
| CN | 105828161 A | 8/2016 |
| CN | 105915979 A | 8/2016 |
| CN | 107995535 A | 5/2018 |
| CN | 108124167 A | 6/2018 |
| CN | 109063101 A | 12/2018 |

* cited by examiner transmitting a video acquiring request for a video to a server when current display information in a user interaction interface is the information of previewing the video, wherein the video acquiring request comprises identification information of the video — S110 transmitting a video acquiring request for a video to a server when current display information in a user interaction interface is the information of previewing the video, wherein the video acquiring request comprises identification information of the video — S120

```
receiving a video acquiring request transmitted by a client, wherein the video
 acquiring request comprises identification information of the video, and         S210
wherein the video is a video corresponding to current display information in a
              user interaction surface of the client pushing video information of the video corresponding to the identification
   information to the client based on the video acquiring request, so that the client    S220
   displays the video information through a video preview window, wherein the
      video preview window is suspended above the user interaction interface
```

METHOD, APPARATUS FOR PROCESSING VIDEO, ELECTRONIC DEVICE AND COMPUTER-READABLE STORAGE MEDIUM

CROSS-REFERENCE TO RELATED APPLICATION

The present disclosure is a continuation of PCT International Application No. PCT/CN2018/125404, filed Dec. 29, 2018, which claims the priority of Chinese Patent Application No. 201811605064.9 filed on Dec. 26, 2018, the entire contents of which are incorporated herein by reference for all purposes.

TECHNICAL FIELD

The disclosure relates to an Internet technology field, and particularly relates to a method, an apparatus for processing video, electronic device and computer-readable storage medium.

BACKGROUND

With the improvement of people's living standards, terminal applications, especially entertainment applications, have become an integral part of people's lives.

At present, when a user browses videos of other users through an application, a list of video covers displayed on a display screen of a terminal is usually used to select the video of interest, and to enter the corresponding playing screen for watching the complete video content. However, because the video cover is usually an image selected by the author of the video or a cover image configured in the background, the video cover may not be related to the video content. Therefore, the user can understand the content played by the video only after entering the video playing screen. If it is not the content that the user is interested, the user needs to exit the playing screen and return to the list of the video covers to re-select the video that they are interested. The above video selection method is complicated in the process of selecting the video of interest, so that the user's interactive experience is degraded. In addition, when entering the playing screen through the video cover, the video information corresponding to the video cover needs to be loaded. During the loading process, the user may wait too long for the video information, and it also degrades the user's interactive experience.

As can be seen, the user operations are complicated in the current existing video selection methods, and the user interaction experience is poor.

SUMMARY

According to a first aspect of the present disclosure, a video processing method is provided, and the method may include: transmitting a video acquiring request for a video to a server when current display information in a user interaction interface is preview information of the video, wherein the video acquiring request includes identification information of the video; receiving video information corresponding to the video pushed by the server based on the video acquiring request, and displaying the video information through a video preview window, wherein the video preview window is suspended above the user interaction interface.

According to an embodiment of the present disclosure, the method may further include: receiving a video preview operation from a user through the user interaction interface; identifying a first display information in the user interaction interface when the video preview operation is completed; determining the first display information as current display information in the user interaction interface, or determining, the display information of the file included in the first display information that that satisfies a preset condition, as current display information in the user interaction interface when the first display information includes display information of multiple files.

According to an embodiment of the present disclosure, the preset condition may include: a second display information of the file occupies the largest display area in the user interaction interface; or a third display information of the file is the display information corresponding to the video, and the third display information of the file occupies the largest display area in the user interaction interface.

According to an embodiment of the present disclosure, the video preview window is suspended above preview information of the video corresponding to the video information.

According to an embodiment of the present disclosure, the method may further include: receiving a video selection operation from the user through the user interaction interface; displaying a first display screen corresponding to the video, in response to the video selection operation, and displaying the video information of the video through the first display screen.

According to an embodiment of the present disclosure, the receiving the video selection operation from the user through the user interaction interface may include receiving the video selection operation from the user through the video preview window.

According to an embodiment of the present disclosure, when the video is a live broadcast video, the video information is live broadcast information, and the live broadcast information of each live broadcast room includes the live broadcast video, function configuration information and interaction information, the function configuration information of each live broadcast room is the same; each display screen includes a first sub-screen and a second sub-screen, the second sub-screen is a transparent screen suspended above the first sub-screen, the first sub-screen is used to display the current live broadcast video in the live broadcast room, the second sub-screen is used to display interaction information and function configuration information corresponding to the current live broadcast video in the live broadcast room; the method further includes: receiving a live broadcast room switching operation from the user through the first display screen; displaying the function configuration information of the first display screen on a second sub-screen of a second display screen corresponding to the live broadcast video of the switched live broadcast room, in response to the live broadcast room switching operation; acquiring the live broadcast video and interaction information of the switched live broadcast room; displaying the live broadcast video of the switched live broadcast room on the first sub-screen of the second display screen, and displaying the interactive information of the switched live broadcast room on the second sub-screen of the second display screen.

According to a second aspect of the present disclosure, a video processing method is provided, and the method may include: receiving a video acquiring request transmitted by a client, wherein the video acquiring request includes identification information of the video, and wherein the video is a video corresponding to current display information in a user interaction surface of the client; pushing video information of the video corresponding to the identification information to the client based on the video acquiring request, so that the client displays the video information through a video preview window, wherein the video preview window is suspended above the user interaction interface.

According to an embodiment of the present disclosure, the method further includes: receiving a video acquiring request transmitted by a client; pushing video information of the video corresponding to the video acquiring request to the client based on the video acquiring request, so that the client displays the video information of the video corresponding to the video acquiring request through a first display screen.

According to an embodiment of the present disclosure, when the video is a live broadcast video, the video information is live broadcast information, and the live broadcast information of each live broadcast room includes the live broadcast video, function configuration information and interaction information, the function configuration information of each live broadcast room is the same; each display screen includes a first sub-screen and a second sub-screen, the second sub-screen is a transparent screen suspended above the first sub-screen, the first sub-screen is used to display the current live broadcast video in the live broadcast room, the second sub-screen is used to display interaction information and function configuration information corresponding to the current live broadcast video in the live broadcast room; the method further includes: receiving a live broadcast room switching request from the client; pushing the live broadcast video and interaction information of the switched live broadcast room to the client based on the live broadcast room switching request, so that the client displays the live broadcast video of the switched live broadcast room on the first sub-screen of the second display screen corresponding to the switched live broadcast room, and displays the interactive information of the switched live broadcast room on the second sub-screen of the second display screen, wherein the function configuration information on the second sub-screen of the second display screen is the function configuration information on the first display screen.

According to a third aspect of the present disclosure, a video processing apparatus is provided, and the video processing apparatus may include: an information processing module, configured to transmit a video acquiring request for a video to a server when current display information in a user interaction interface is preview information of the video, wherein the video acquiring request includes identification information of the video; and an information display module, configured to receive video information corresponding to the video pushed by the server based on the video acquiring request and display the video information through a video preview window, wherein the video preview window is suspended above the user interaction interface.

According to an embodiment of the present disclosure, the apparatus may further include a current display information determination module, configured to receive a video preview operation from a user through the user interaction interface; identify a first display information in the user interaction interface when the video preview operation is completed; determine the first display information as current display information in the user interaction interface, or determine, the display information of the file included in the first display information that that satisfies a preset condition, as current display information in the user interaction interface when the first display information includes display information of multiple files.

According to an embodiment of the present disclosure, the preset condition may include: a second display information of the file occupies the largest display area in the user interaction interface; or a third display information of the file is the display information corresponding to the video, and the third display information of the file occupies the largest display area in the user interaction interface.

According to an embodiment of the present disclosure, the video preview window is suspended above preview information of the video corresponding to the video information.

According to an embodiment of the present disclosure, the apparatus may further include a video display module, configured to receive a video selection operation from the user through the user interaction interface; display a first display screen corresponding to the video, in response to the video selection operation, and display the video information of the video through the first display screen.

According to an embodiment of the present disclosure, the video display module is configured to receive the video selection operation from the user through the video preview window.

According to an embodiment of the present disclosure, when the video is a live broadcast video, the video information is live broadcast information, and the live broadcast information of each live broadcast room includes the live broadcast video, function configuration information and interaction information, the function configuration information of each live broadcast room is the same; wherein each display screen includes a first sub-screen and a second sub-screen, the second sub-screen is a transparent screen suspended above the first sub-screen, the first sub-screen is used to display the current live broadcast video in the live broadcast room, the second sub-screen is used to display interaction information and function configuration information corresponding to the current live broadcast video in the live broadcast room; the apparatus further includes a live broadcast room switching module, configured to receive a live broadcast room switching operation from the user through the first display screen; display the function configuration information of the first display screen on a second sub-screen of a second display screen corresponding to the live broadcast video of the switched live broadcast room, in response to the live broadcast room switching operation; acquire the live broadcast video and interaction information of the switched live broadcast room; display the live broadcast video of the switched live broadcast room on the first sub-screen of the second display screen, and display the interactive information of the switched live broadcast room on the second sub-screen of the second display screen.

According to a fourth aspect of the present disclosure, a video processing apparatus is provided, and the apparatus may include: a video request receiving module, configured to receive a video acquiring request transmitted by a client, wherein the video acquiring request includes identification information of the video, and wherein the video is a video corresponding to current display information in a user interaction surface of the client; and a video pushing module, configured to push video information corresponding to the identification information to the client based on the video acquiring request, so that the client displays the video information through a video preview window, wherein the video preview window is suspended above the user interaction interface.

According to an embodiment of the present disclosure, the apparatus may further include a video acquiring module, configured to receive a video acquiring request transmitted by a client, push video information corresponding to the video acquiring request to the client based on the video acquiring request, so that the client displays the video information corresponding to the video acquiring request through a video preview window, wherein the video preview window is suspended above the user interaction interface.

According to an embodiment of the present disclosure, when the video is a live broadcast video, the video information is live broadcast information, and the live broadcast information of each live broadcast room includes the live broadcast video, function configuration information and interaction information, the function configuration information of each live broadcast room is the same; each display screen includes a first sub-screen and a second sub-screen, the second sub-screen is a transparent screen suspended above the first sub-screen, the first sub-screen is used to display the current live broadcast video in the live broadcast room, the second sub-screen is used to display interaction information and function configuration information corresponding to the current live broadcast video in the live broadcast room; the apparatus further includes a live broadcast video switching module, configured to receive a live broadcast room switching request from the client; pushing the live broadcast video and interaction information of the switched live broadcast room to the client based on the live broadcast room switching request, so that the client displays the live broadcast video of the switched live broadcast room on the first sub-screen of the second display screen corresponding to the switched live broadcast room, and displays the interactive information of the switched live broadcast room on the second sub-screen of the second display screen, wherein the function configuration information on the second sub-screen of the second display screen is the function configuration information on the first display screen.

According to a fifth aspect of the present disclosure, an electronic device is provided, and the electronic device may include: a memory, configured to store computer-executable instructions; and a processor, configured to execute the method according to the first aspect of the disclosure by invoking the computer-executable instructions.

According to a sixth aspect of the present disclosure, it provides a computer-readable storage medium storing at least one operations, at least one programs, code set or instruction set that, when loaded and executed by the computer, to implement the method of the first aspect of the present disclosure.

According to embodiments of the present disclosure, the user can preview video information corresponding to respective videos through a video preview window in the user interaction interface, that is, the user can directly select a video of interest by using the video information displayed in the video preview window, without entering the video playing screen. This improves the user's interactive experience.

BRIEF DESCRIPTION OF THE DRAWINGS

In order to explain the technical solutions in the embodiments of the present disclosure more clearly, the drawings used in the description of the embodiments of the present application will be briefly illustrated below.

DETAILED DESCRIPTION

The embodiments of the present disclosure are described in detail below, and the examples of the embodiments are illustrated in the drawings, wherein throughout the drawings, the same or similar reference numbers are used to depict the same or similar elements or elements having the same or similar functions. The embodiments described below with reference to the accompanying drawings are illustrative, and are only used to explain the present disclosure, rather than being construed as limiting the present disclosure.

Those skilled in the art should understand that the singular forms "a", "an", and "the" include plural referents unless the context clearly dictates otherwise. It should be further understood that the expression "comprising" or "include" used in the specification of the present disclosure means the existence of the features, integers, steps, operations, elements and/or components, but does not preclude the existence or addition of one or more other features, integers, steps, operations, elements, components and/or combinations thereof. It should be understood when an element is referred to as being "connected to" or "coupled to" another element, it may be directly connected or coupled to the other element, or an intervening element may be present. Furthermore, the terms "connected" or "coupled" used herein may include a wireless connection or a wireless coupling. The phrase "and/or" used herein includes all or any one and all combinations of one or more of the associated listed items.

The following exemplary embodiments are set forth to describe the technical solutions of the present disclosure and how the technical solutions of the present disclosure solve the above technical problems in detail. The following embodiments may be combined with each other, and the same or similar concepts or processes may not be repeated in some embodiments. The embodiments of the present disclosure will be described below in conjunction with the accompanying drawings.

Figure 1:
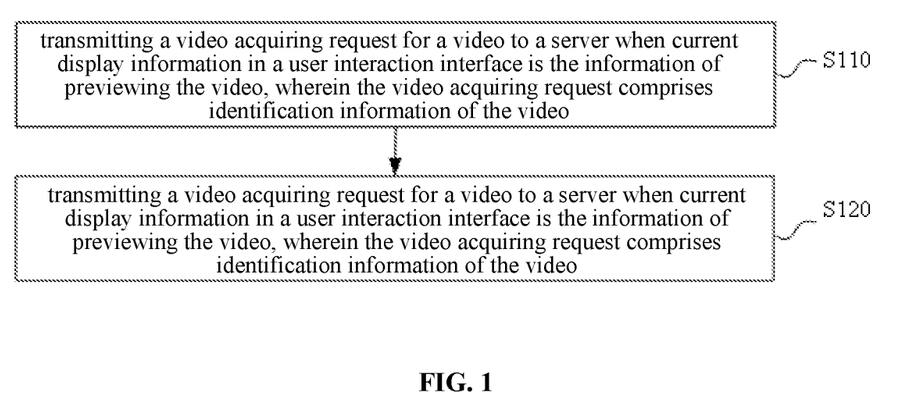
FIG. 1 is a schematic flowchart of a video processing method according to an embodiment of the present disclosure.

FIG. 1 is a schematic flowchart of a video processing method. An embodiment of the present disclosure provides a video processing method. As shown in FIG. 1, the method may include the following steps.

Step S110: a video acquiring request for a video is transmitted to a server when current display information in a user interaction interface is preview information of the video, wherein the video acquiring request includes identification information of the video.

The user interaction interface is a type of user interface displayed by the user client. The user interaction interface is used for performing interaction between the terminal device and the user. Through this interface, the operations related to the user may be received, such as the selection of the current display on the user interaction interface, etc. The current display information may be the information currently displayed in the user interaction interface, and may include different types of information, such as text, pictures, symbols, advertisements, and video related information. The present disclosure does not limit the form of the current display information.

Before the user enters the playing screen corresponding to the video, the preview information of the video may provide a reference for the user to select the video that he is interested. The preview information of the video may be information related to the video, or it may be information which reflects the video content of the video. The content information may also be information that reflects the characteristics of the characters in the video. The preview information of the video may attract users to open the playing screen corresponding to the preview information. The display form of the preview information is not limited in this disclosure. It may be images, text, symbols or videos. The identification information of the video is information indicating the identity of the video, and the identification information corresponds to respective corresponding videos one by one. For example, the identification information may be user identification (ID) information.

Step S120, the video information corresponding to the video pushed by the server is received according to the video acquiring request, and the video information is displayed through a video preview window, and the video preview window is suspended above the user interaction interface.

A mapping relationship between each video and the identification information may be stored in the server in advance. When the server receives the identification information of the video transmitted by the client, it may push the video information related to the video corresponding to the identification information to the client based on the mapping relationship, the client displays the video information through the video preview window. In practical applications, the video preview window may be suspended above a preset position on the user interaction interface, and the preset position may be a display position that is preset based on a seize of the user interaction interface of the user's client, such as the upper-left corner of the user interaction interface. The size of the video preview window is smaller than that of the display screen of the video preview information, so that the video preview window only obscures part of the preview information.

The initial size of the video preview window may be configured according to actual requirements, and the size may be preferably selected as much as possible to reduce the occlusion the preview information of the video, thereby no affecting the user's viewing of the preview information. For example, the size of the video preview window may be configured according to the size of the display screen of the preview information. For example, the video preview window is one third or one fifth of the display screen corresponding to the preview information.

According to an embodiment of the present disclosure, the user may preview video information corresponding to each video through a video preview window in a user interaction interface, that is, the user may directly select a video of interest by using the video information displayed on the video preview window, without entering the video playing screen. This may improve the user's interactive experience.

According to the embodiment of the present disclosure, the preview information may be a cover image corresponding to a video pushed by the server.

The preview information is information for users to preview the content of the video. Through the preview information, the user can first have a preliminary understanding of the corresponding video content. Therefore, the preview information may be used as the cover image of the corresponding video. The cover image may be the head portrait of the video author, or an image selected by the video author. When the user previews the video preview information through the user interaction interface, the cover image is pushed to the user's terminal device by the server, and is displayed through the user interaction interface of the terminal device.

According to an embodiment of the present disclosure, the method may further include: receiving a video preview operation from a user through the user interaction interface; identifying a first display information in the user interaction interface when the video preview operation is completed; and determining the current display information of the user interaction interface according to the first display information.

The video preview operation refers to an operation in which a user selects a video of interest through a user interaction interface, and a specific form of the operation may be configured as required. For example, the operation may be a trigger action of a user specifying an operation position on an interface of a client application. In actual applications, the operation may be triggered by the relevant trigger identifier of the client, such as a specified trigger button or input box on the client interface, or the operation may be a user's voice command. Specifically, the operation may be an operation of the user sliding (such as sliding up or down) on the user interaction interface, and in this solution, the operation of the user sliding on the user interaction interface is the user's video preview operation. The first display information is information displayed in the user interaction interface when the video preview operation is completed, that is, video preview information.

Figure 2:
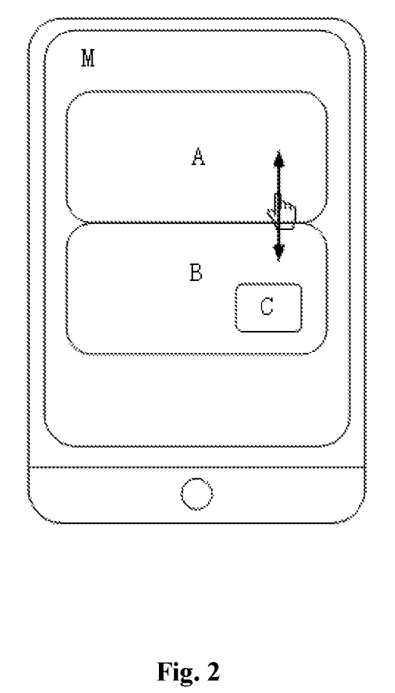
FIG. 2 is a schematic diagram of a user interaction interface according to an embodiment of the present disclosure.

As an example, FIG. 2 illustrates a schematic diagram of a user interaction interface of a client application in a terminal device. The user interaction interface is M. The current display information in the user interaction interface M may include preview information A of video a and preview information B of video b. The operation of sliding up or down on the user interaction interface M may be the user's video preview operation. If the first display information determined by sliding up or down on the user interaction interface is the preview information B of video b, the video information of the video b is suspended and displayed on the user interaction interface M through the video preview window C.

In actual applications, the preview information of the video displayed on the user interaction interface is the information pushed by the server. The server may configure the order of displaying the preview information in the user interaction interface according to the actual needs. For example, the server may display the preview information of each video in the user interaction interface based on all traffic of visiting videos in the current time period, and the preview information of each video may also be displayed in the user interaction interface according to the user's attentions. However, the order of the video preview information in the user interaction interface is not limited in this disclosure.

According to an embodiment of the present disclosure, the shape of the video preview window may include but is not limited to a circle, a rectangle, or other shapes, which may be configured according to actual needs.

According to an embodiment of the present disclosure, the determining the current display information in the user interaction interface according to the first display information may include: determining the first display information as current display information in the user interaction interface, or determining, the display information of the file included in the first display information that that satisfies a preset condition, as current display information in the user interaction interface when the first display information includes display information of multiple files.

The user interaction interface may display multiple types of information, that is, different files may correspond to different types of information, and may also correspond to the same type of information. The information of different files may include information such as advertisements, audio, or live broadcast video. In the application, in order to display the display information of the file more clearly, the amount of information displayed by the user interaction interface at one time may be configured based on the size of the display screen of the user's terminal device, that is, the display information of one file or multiple files may be displayed in the user interaction interface at one time. When the display information of only one file is displayed at one time in the user interaction interface, the display information of the file is the first display information, and the first display information is the current display of the user interaction interface information. If the display information of multiple files are displayed at one time in the user interaction interface, the display information of multiple files may be as the current display information, or the display information of multiple files that meet preset conditions may be selected as the current display information of the user interaction interface. The display information of the file refers to the preview information of the file displayed in the user interaction interface. Based on the size of the display screen of the user's terminal device, when multiple files are displayed in the user interaction interface at one time, a part of the information of some file among multiple files may be displayed, that is, the preview information of the file may be all or a part of the preview information of the file, wherein the multiple files may include at least two files.

Figure 3A:
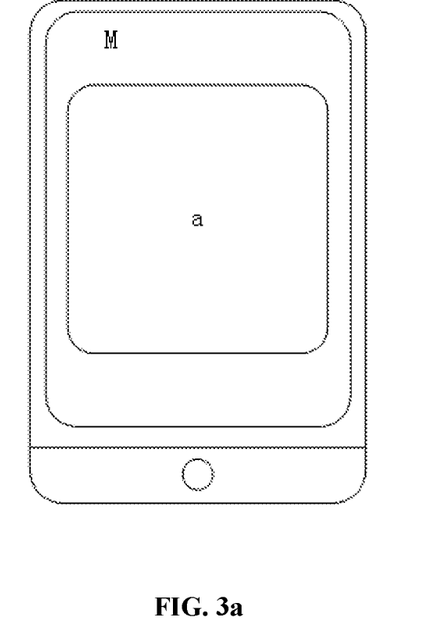
FIG. 3a is a schematic diagram of a display mode of current display information according to an embodiment of the present disclosure.

In an example, the multiple files displayed in the user interaction interface may include different types of files, such as advertisement files. When the display information of only one file is displayed at one time in the user interaction interface, the display information of the file is the first display information, and the first display information is the current display information in the user interaction interface. FIG. 3a illustrates a schematic diagram of a display mode of the current display information in the user interaction interface, and the user interaction interface M shown in the figure can only display at one time the display information of one file, that is, information a, the information a is the first display information, and the first display information is the current display information in the user interaction interface.

Figure 3B:
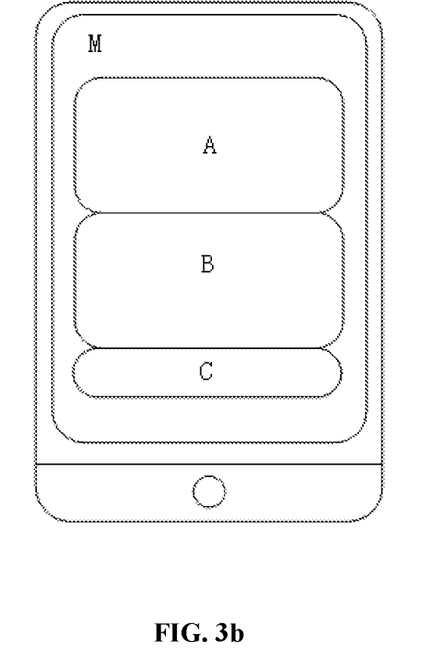
FIG. 3b is a schematic diagram of another display mode of current display information according to an embodiment of the present disclosure.

When the display information of multiple files can be displayed at one time in the user interaction interface, the display information of multiple files that meet preset conditions may be selected as the current display information of the user interaction interface. FIG. 3b illustrates schematic diagram of another display mode of the current display information in the user interaction interface, and the user interaction interface M shown in the figure can display preview information of three files at one time, that is, information A, information B, and information C. It is assumed that the files corresponding to information A and information B are files that meet preset conditions, then information A and information B are the current display information in the user interaction interface. Since the size of the display screen of the user's terminal device is limited, only a part of the preview information of the file corresponding to the information C is displayed.

According to an embodiment of the present disclosure, the area of the user interaction interface occupied by the display information of different types of files may be configured to be the same or different. For example, the area occupied by the preview information of the video in the user interaction interface may be different with that occupied by the display information of the file corresponding to the advertisement in the user interaction interface. For example, it may configure that the preview information of the video occupies the largest display area in the user interaction interface.

According to an embodiment of the present disclosure, the preset condition may include any one of the followings.

First condition, the second display information of the file occupies the largest display area in the user interaction interface.

The preset condition may be configured based on actual requirements. Regardless of the type of file displayed in the user interaction interface being the file corresponding to the video, or other types of files, a file of which the second display information occupies the largest display area in the user interaction interface may be directly determined as the file that meets the preset condition, wherein the second display information of the file refers to the current display information in the user interaction interface.

Figure 4A:
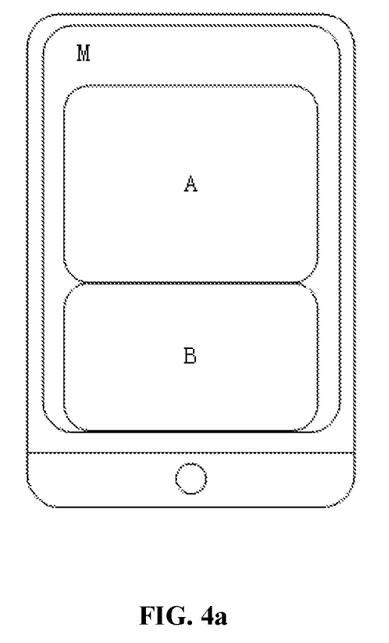
FIG. 4a is a schematic diagram of a method for determining a file that meets a preset condition according to an embodiment of the present disclosure.

In an example, FIG. 4a illustrates a schematic diagram of a method for determining a file that meets a preset condition. The user interaction interface M shown in the figure displays the display information (preview information) of two files, that is, the display information A of the file a and the display information B of the file b. As shown in FIG. 4a, the display area occupied by the information A in the user interaction interface M is larger than the display area occupied by the information B in the user interaction interface M, among files a and b, the file a is a file that meets a preset condition.

Second condition, the third display information of the file is the display information corresponding to the video, and the third display information of the file occupies the largest display area in the user interaction interface.

The files displayed on the user interaction interface may be different types of files, that is, the multiple files displayed on the user interaction interface include not only the files corresponding to the video, but also other types of files, such as advertisement files, it may first determine the file corresponding to the video among the multiple files, and select the file of which the third display information occupies the largest display area in the user interaction interface from the files corresponding to the determined videos, and determine the file with the largest area as the file that meets the preset conditions.

Figure 4B:
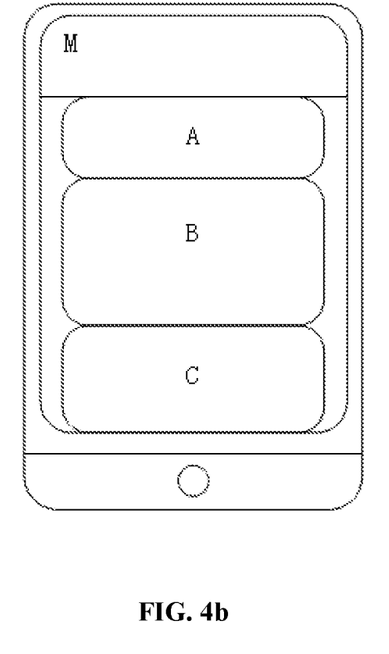
FIG. 4b is a schematic diagram of another method for determining a file that meets a preset condition according to an embodiment of the present disclosure.

In an example, FIG. 4b illustrates another schematic diagram of determining a file that meets the preset condition. The user interaction interface M shown in the figure displays preview information of three files, which are respectively the information A of file a, the information B of the file b and the information C of the file c. The information A and the information B are preview information of the video, and the file c is the file corresponding to the advertisement, then it may not consider the display area occupied by the information C of the file c in the user interactive interface M, and directly select the file which occupies the largest display area in the user interactive interface M from file a and file b in this example. As shown in FIG. 4b, the display area occupied by the information B in the user interactive interface M is larger than that occupied by the information A in the user interaction interface M, among the file a and the file b, the file b is a file that meets a preset condition.

It can be understood that, the above occupied area in the user interaction interface is relatively largest. For example, if the user interaction interface includes two files, the file with the largest display area is the file of which the display areas corresponding to the two files is larger.

According to an embodiment of the present disclosure, the video preview window is suspended above the preview information of the video corresponding to the video information.

In order to provide users with a more intuitive preview effect, a video preview window may be displayed above the preview information of the video corresponding to the video information. The video information displayed in the video preview window may be a video information in the video corresponding to the preview information, the user can directly understand the video content in the corresponding video through the video preview window, and it may help the user better select the video that he wants to watch.

It can be understood that the number of video preview windows may be configured according to actual requirements, and the number of video preview windows may also be determined based on the number of files corresponding to the current display information. If the number of video preview windows is determined based on the number of files corresponding to the current display information, multiple video preview windows may be displayed in the user interaction interface at the same time. For example, if the number of files corresponding to the current display information is two, it may respectively suspend and display one video preview window over the preview information corresponding to the two files. If the number of video preview windows is configured based on actual requirements, for example, the corresponding video preview window is only configured for the preview information of the video firstly loaded on the user interaction interface (the preview information of the first displayed video), the video preview window is only suspended and displayed over the preview information of the firstly loaded video displayed in the user interaction interface.

Figure 5:
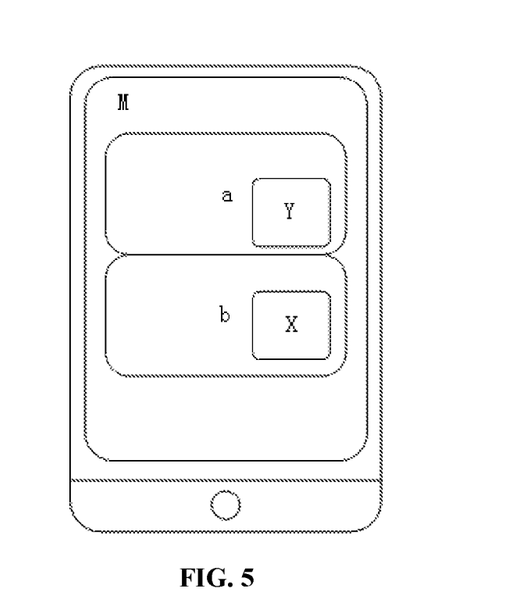
FIG. 5 is a schematic diagram of a video preview window according to an embodiment of the present disclosure.

In an example, if the number of video preview windows is determined based on the number of files corresponding to the current display information, as shown in FIG. 5, the user interaction interface M includes two files of files a and b, and both of file a and file b are the files corresponding to the video, a video preview window Y may be suspended and displayed over the preview information corresponding to file a, and a video preview window X may be suspended and displayed over the preview information corresponding to file b.

In this example, if the number of video preview windows is configured based on actual requirements, that is, the video preview window is displayed only over the preview information of the video firstly loaded on the user interaction interface, as shown in FIG. 5, although the user interaction interface M shown includes two files of file a and file b, the preview information of file a is the preview information of the firstly loaded video on the user interaction interface M, that is, the video preview information of the first video displayed on the current user interaction interface, a video preview window Y is only displayed over the preview information corresponding to file a. In practical applications, in order to facilitate user preview, it usually displays only one video preview window at one time in the user interaction interface.

According to an embodiment of the present disclosure, the method may further include: receiving a video selection operation from the user through the user interaction interface; displaying a first display screen corresponding to the video, in response to the video selection operation, and displaying the video information of the video through the first display screen.

The video selection operation refers to an operation in which a user selects video information of a video to be watched, that is, an operation in which a user selects a video to be watched in a user interaction interface. A specific form of the operation may be configured as required. For example, the operation may be a trigger action of a user specifying an operation position on an interface of a client application. In actual applications, the operation may be triggered by the relevant trigger identifier of the client, such as a specified trigger button or input box on the client interface, or the operation may be a user's voice command. Specifically, the operation may be an operation of the user clicking on the user interaction interface. Based on the user's video selection operation, the video information corresponding to the video selection operation may be watched, and the video information of the video may be displayed through the corresponding first display screen. Since the video information of the video has already been loaded when the video information corresponding to the video is displayed through the video preview window, it does not need to load the video information again when watching the video based on the video selection operation. The video information of the video may be watched at the same time when entering the playing screen corresponding to the video. It may reduce the response time for watching videos, and further improve the user's interactive experience.

According to an embodiment of the present disclosure, the receiving the video selection operation from the user through the user interaction interface may include receiving the video selection operation from the user through the video preview window.

The user can directly click the video preview window to enter the playing screen corresponding to the video, that is, the operation of the user clicking the video preview window is the user's video selection operation.

According to an embodiment of the present disclosure, the method may further include receiving a video switching operation from the user through the first display screen; displaying the video information of the video corresponding to the video switching operation on a second display screen in response to the video switching operation.

The video switching operation refers to an operation that the user wants to switch from the current video to another video, that is, the operation that the user wants to switch from the first display screen to the second display screen. The specific form of the operation may be configured as required. For example, the operation may be a trigger action of a user specifying an operation position on an interface of a client application. In actual applications, the operation may be triggered by the relevant trigger identifier of the client, such as a specified trigger button or input box on the client interface, or the operation may be a user's voice command. Specifically, the operation may be an operation of the user sliding left or right on the first display screen. Based on the user's video switching operation, the video corresponding to the video switching operation may be accessed, and the video information of the video may be displayed through the corresponding second display screen.

According to an embodiment of the present disclosure, if the video is a live broadcast video, the video information is live broadcast information, and the live broadcast information of each live broadcast room includes the live broadcast video, function configuration information and interaction information, the function configuration information of each live broadcast room is the same;

Each display interface includes a first sub-interface and a second sub-interface, the second sub-interface is a transparent interface suspended above the first sub-interface, the first sub-interface is used to display the current live broadcast video in the live broadcast room, the second sub-interface is used to display interaction information and function configuration information corresponding to the current live broadcast video in the live broadcast room.

The live broadcast video is a video recorded by the anchor of the live broadcast room in real time, and the function configuration information indicates information pre-configured in each live broadcast room for implementing different functions, such as an input box for users posting interactive information, a virtual button for sharing corresponding live broadcast room, and a virtual function button for users exiting the corresponding live broadcast room, etc.; the function configuration information of each live broadcast room is the same, that is, these function configuration information is required for each live broadcast room to perform a live broadcast. The interactive information indicates information corresponding to real-time interactions among users who visit the current live broadcast room, including gift information and text comment information. The present disclosure does not limit the expression form of the gift information, which may be pictures, sound effects, or other forms of information.

The live broadcast information of the corresponding live broadcast room is displayed through the display screen in each live broadcast room. Since the live broadcast video and interactive information in the live broadcast information changes in real time, and the function configuration information is always unchanged, the display screen is divided into two sub-screens, i.e., the first sub-screen and the second sub-screen, and the second sub-screen is a transparent screen suspended above the first sub-screen, so that the display effect is not affected when the live broadcast information are displayed through the first sub-screen and the second sub-screen are displayed. That is, the display effect of the live broadcast information displayed through two sub-pages is consistent with the effect displayed through one display screen.

According to an embodiment of the present disclosure, based on the configuration of the display screen described above, the following operations may also be performed: receiving a live broadcast room switching operation from the user through the first display interface; displaying the function configuration information of the first display interface in a second sub-interface of a second display interface corresponding to the live broadcast video of the switched live broadcast room, in response to the live broadcast room switching operation; acquiring the live broadcast video and interaction information of the switched live broadcast room; displaying the live broadcast video of the switched live broadcast room in the first sub-interface of the second display interface, and displaying the interactive information of the switched live broadcast room in the second sub-interface of the second display interface.

Under the condition of not affecting the display effect, since the live broadcast information is displayed through two sub-screens and the function configuration information of each live broadcast room is the same, when the user switches from one live broadcast room to another, the function configuration information of the first display screen can be directly displayed on the second sub-screen of the second display screen corresponding to the switched live broadcast video based on the live broadcast room switching operation. The live broadcast video and interactive information of the switched live broadcast room needs to be loaded in real time, and then they are respectively displayed on the corresponding sub-screens after being loaded. Since in the process of switching from one live broadcast room to another, it only needs to load the real-time changing live broadcast video and interaction information, and does not need to load the function configuration information, it can reduce the amount of information loaded each time, reduce the response time for switching between live broadcast rooms, and further improve the user's interactive experience.

According to an embodiment of the present disclosure, it may further include: receiving an operation for hiding information on the second sub-screen through the second sub-screen; hiding the information displayed on the second sub-screen in response to the operation for hiding information; receiving an operation for displaying information on the second sub-screen through the second sub-screen; and suspending and displaying the corresponding information on the second sub-screen above the first sub-screen in response to the operation for displaying information.

The information hiding operation refers to an operation that the user wants to hide the information displayed on the second sub-screen, that is, the user wants to hide the information displayed on the second sub-screen under the condition of the information on both sub-screens being displayed to the user. The specific form of the operation may be configured as required. For example, the operation may be a trigger action of a user specifying an operation position on an interface of a client application. In actual applications, the operation may be triggered by the relevant trigger identifier of the client, such as a specified trigger button or input box on the client interface, or the operation may be a user's voice command. Specifically, the operation may be an operation of the user sliding left or right on the second sub-screen. In this solution, since the function configuration information and interaction information are displayed on the second sub-screen, and the live broadcast video is displayed on the first sub-screen, that is, the live broadcast video is separately displayed from the other two types of information. Based on the user's hiding information operation, it may hide the function configuration information and interaction information displayed on the second sub-screen.

When only the live broadcast video is displayed, the display screen is keeping clean and tidy, and it can further improve the user's interactive experience.

Similarly, the information display operation refers to an operation that the user wants to redisplay the information displayed on the second sub-screen, that is, the user wants to redisplay the information hidden on the second sub-screen on the first sub-screen under the condition that the user can only see the live broadcast video displayed on the first sub-screen. The specific form of the operation may be configured as required. For example, the operation may be a trigger action of a user specifying an operation position on an interface of a client application. In actual applications, the operation may be triggered by the relevant trigger identifier of the client, such as a specified trigger button or input box on the client interface, or the operation may be a user's voice command. In order to facilitate user operations, the information display operation may be an operation of the user sliding left or right on the second sub-screen, which corresponds to the information hiding operation. In this solution, since the function configuration information and interaction information are displayed on the second sub-screen, and the live broadcast video is displayed on the first sub-screen, that is, the live broadcast video is separately displayed from the other two types of information. Based on the user's displaying information operation, it may redisplay the function configuration information and interaction information hidden on the second sub-screen to the user. It can further improve the user's interactive experience through the above operation.

According to an embodiment of the present disclosure, the method may further include: if the live broadcast room corresponding to the current display information in the user interaction interface has stopped broadcasting, deleting the preview information corresponding to the live broadcast room that has stopped broadcasting from the user interaction interface.

In order to save the display resources of the user interaction interface, the preview information corresponding to the live broadcast room that has stopped broadcasting may be deleted from the user interaction interface.

Figure 6:
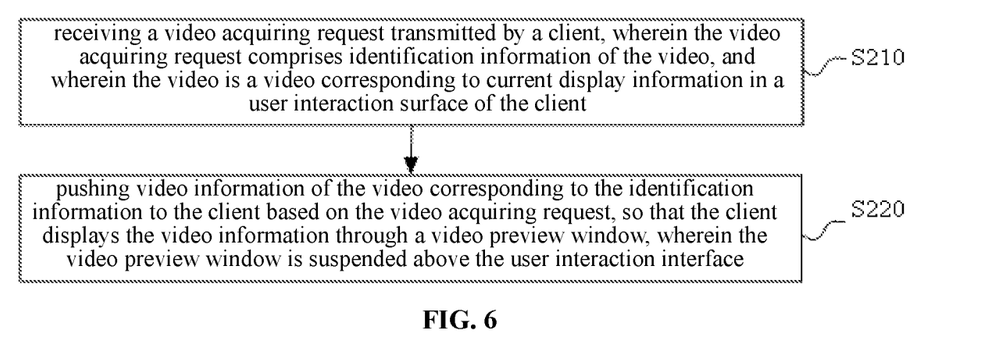
FIG. 6 is a schematic flowchart of another video processing method according to an embodiment of the present disclosure.

According to an embodiment of the present disclosure, FIG. 6 illustrates a schematic flowchart of another video processing method, the embodiment of the present disclosure provides a video processing method. As shown in FIG. 6, the method may include the following steps.

Step S210: a video acquiring request transmitted by a client is received, wherein the video acquiring request includes identification information of the video, and wherein the video is a video corresponding to current display information in a user interaction surface of the client.

Step S220: video information corresponding to the identification information is pushed to the client based on the video acquiring request, so that the client displays the video information through a video preview window, wherein the video preview window is suspended above the user interaction interface.

It can be understood that the method shown in FIG. 6 and the method shown in FIG. 1 are based on different perspectives, that is, the methods performed by different subjects. Specifically, the video processing method shown in FIG. 1 is described based on the perspective of a user terminal device (i.e., a client). The video processing method shown in FIG. 6 is described based on the perspective of the server. The principles of the two solutions are the same. For the detailed description of the server and other specific implementation solutions, please refer to the previous description of the client.

According to an embodiment of the present disclosure, the method may further include: receiving a video acquiring request transmitted by a client; pushing video information of the video corresponding to the video acquiring request to the client based on the video acquiring request, so that the client displays the video information of the video corresponding to the video acquiring request through a first display screen.

The video acquiring request may be a request generated by a user on a user interaction interface of a client for a video selection operation in the live broadcast room. The request may include identification information of a video to be acquired, and the server may transmit the video information corresponding to the request to the client of the terminal device according to the video acquiring request.

According to an embodiment of the present disclosure, if the video is a live broadcast video, the video information is live broadcast information, and the live broadcast information of each live broadcast room includes the live broadcast video, function configuration information and interaction information, the function configuration information of each live broadcast room is the same; each display screen includes a first sub-screen and a second sub-screen, the second sub-screen is a transparent screen suspended above the first sub-screen, the first sub-screen is used to display the current live broadcast video in the live broadcast room, the second sub-screen is used to display interaction information and function configuration information corresponding to the current live broadcast video in the live broadcast room; the method further includes: receiving a live broadcast room switching request from the client; pushing the live broadcast video and interaction information of the switched live broadcast room to the client based on the live broadcast room switching request, so that the client displays the live broadcast video of the switched live broadcast room on the first sub-screen of the second display screen corresponding to the switched live broadcast room, and displays the interactive information of the switched live broadcast room on the second sub-screen of the second display screen, wherein the function configuration information on the second sub-screen of the second display screen is the function configuration information on the first display screen.

Figure 7:
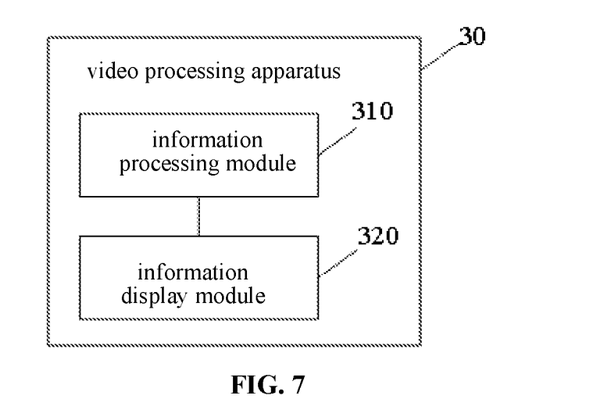
FIG. 7 is a schematic structural diagram of a video processing apparatus according to an embodiment of the present disclosure.

Based on the same principle as the method shown in FIG. 1, an embodiment of the present disclosure further provides a video processing apparatus 30. As shown in FIG. 7, the video processing apparatus 30 may include: an information processing module 310, configured to transmit a video acquiring request for a video to a server when current display information in a user interaction interface is preview information of the video, wherein the video acquiring request includes identification information of the video; and an information display module 320, configured to receive video information corresponding to the video pushed by the server based on the video acquiring request and display the video information through a video preview window, wherein the video preview window is suspended above the user interaction interface.

According to an embodiment of the present disclosure, the apparatus may further include: a current display information determination module, configured to receive a video preview operation from a user through the user interaction interface; identify a first display information in the user interaction interface when the video preview operation is completed; determine the first display information as current display information in the user interaction interface, or determine, the display information of the file included in the first display information that that meets a preset condition, as current display information in the user interaction interface when the first display information includes display information of multiple files.

According to an embodiment of the present disclosure, the preset condition may include: a second display information of the file occupies the largest display area in the user interaction interface; or a third display information of the file is the display information corresponding to the video, and the third display information of the file occupies the largest display area in the user interaction interface.

According to an embodiment of the present disclosure, the video preview window is suspended above preview information of the video corresponding to the video information.

According to an embodiment of the present disclosure, the apparatus may further include: a video display module, configured to receive a video selection operation from the user through the user interaction interface; display a first display screen corresponding to the video, in response to the video selection operation, and display the video information of the video through the first display screen.

According to an embodiment of the present disclosure, the video display module is configured to receive the video selection operation from the user through the video preview window.

According to an embodiment of the present disclosure, when the video is a live broadcast video, the video information is live broadcast information, and the live broadcast information of each live broadcast room includes the live broadcast video, function configuration information and interaction information, the function configuration information of each live broadcast room is the same; each display screen includes a first sub-screen and a second sub-screen, the second sub-screen is a transparent screen suspended above the first sub-screen, the first sub-screen is used to display the current live broadcast video in the live broadcast room, the second sub-screen is used to display interaction information and function configuration information corresponding to the current live broadcast video in the live broadcast room; the apparatus further includes a live broadcast room switching module, configured to receive a live broadcast room switching operation from the user through the first display screen; display the function configuration information of the first display screen on a second sub-screen of a second display screen corresponding to the live broadcast video of the switched live broadcast room, in response to the live broadcast room switching operation; acquire the live broadcast video and interaction information of the switched live broadcast room; display the live broadcast video of the switched live broadcast room on the first sub-screen of the second display screen, and display the interactive information of the switched live broadcast room on the second sub-screen of the second display screen.

Figure 8:
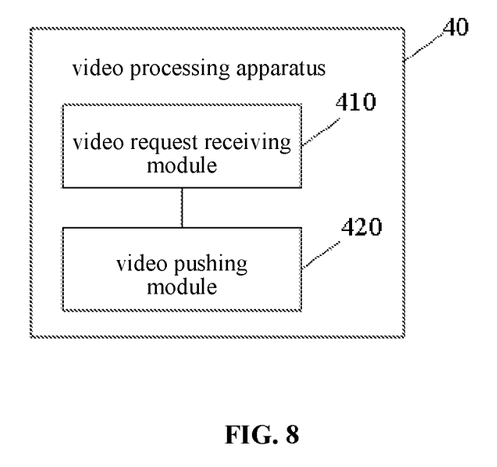
FIG. 8 is a schematic structural diagram of another video processing apparatus according to an embodiment of the present disclosure.

Based on the same principle as the method shown in FIG. 6, an embodiment of the present disclosure further provides a video processing apparatus 40. As shown in FIG. 8, the video processing apparatus 40 may include: a video request receiving module 410, configured to receive a video acquiring request transmitted by a client, wherein the video acquiring request includes identification information of the video, and wherein the video is a video corresponding to current display information in a user interaction surface of the client; and a video pushing module 420, configured to push video information of video corresponding to the identification information to the client based on the video acquiring request, so that the client displays the video information through a video preview window, wherein the video preview window is suspended above the user interaction interface.

According to an embodiment of the present disclosure, the apparatus may further include: a video acquiring module, configured to receive a video acquiring request transmitted by a client, push video information of video corresponding to the video acquiring request to the client based on the video acquiring request, so that the client displays the video information of video corresponding to the video acquiring request through the first display screen.

According to an embodiment of the present disclosure, when the video is a live broadcast video, the video information is live broadcast information, and the live broadcast information of each live broadcast room includes the live broadcast video, function configuration information and interaction information, the function configuration information of each live broadcast room is the same; wherein each display screen includes a first sub-screen and a second sub-screen, the second sub-screen is a transparent screen suspended above the first sub-screen, the first sub-screen is used to display the current live broadcast video in the live broadcast room, the second sub-screen is used to display interaction information and function configuration information corresponding to the current live broadcast video in the live broadcast room; the apparatus further includes a live broadcast video switching module, configured to receive a live broadcast room switching request from the client; pushing the live broadcast video and interaction information of the switched live broadcast room to the client based on the live broadcast room switching request, so that the client displays the live broadcast video of the switched live broadcast room in the first sub-screen of the second display screen corresponding to the switched live broadcast room, and displays the interactive information of the switched live broadcast room on the second sub-screen of the second display screen, wherein the function configuration information on the second sub-screen of the second display screen is the function configuration information on the first display screen.

The video processing apparatus according to the embodiment of the present disclosure may perform a video processing method provided by the embodiments of the present disclosure, and the implementation principles thereof are similar. The operations performed by the modules in the video processing apparatus in the embodiments of the present disclosure correspond to the steps in the video processing method in the embodiments of the present disclosure. For detailed function descriptions of each module of the video processing apparatus, please refer to the description of the corresponding video processing method mentioned above, which are repeated herein.

Based on the same principle as the video processing method according to an embodiment of the present disclosure, the present disclosure provides an electronic device, and the electronic device include: a memory, configured to store computer-executable instructions; and a processor, configured to execute the video processing method according to any one of embodiments of the present disclosure by invoking the computer-executable instructions.

Based on the same principle as the video processing method according to an embodiment of the present disclosure, the present disclosure provides a computer-readable storage medium storing at least one instructions, at least one programs, code set or instruction set that, when loaded and executed by the computer, to implement the video processing method according to any one of embodiments of the present disclosure.

Figure 9:
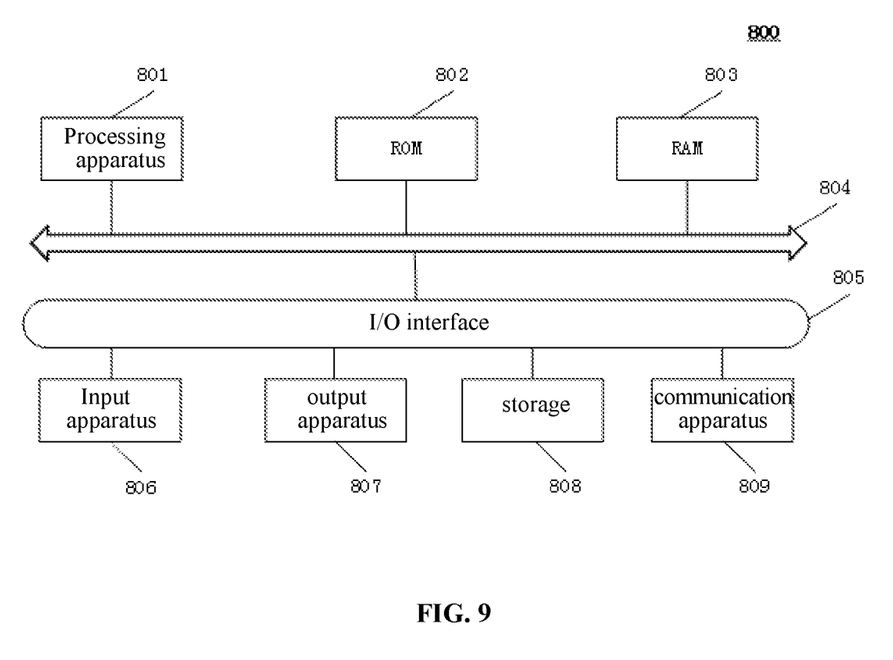
FIG. 9 is a schematic structural diagram of an electronic device according to an embodiment of the present disclosure.

In an example, as shown in FIG. 9, it illustrates a schematic structural diagram of an electronic device 800 (such as a terminal device or server that implements the method shown in FIG. 1 or FIG. 6) suitable for implementing the embodiments of the present disclosure. The electronic device in the embodiment of the present disclosure may include, but is not limited to, a mobile terminal, such as a mobile phone, a notebook computer, a digital broadcast receiver, a personal digital assistant (PDA), a portable android device (PAD), a portable multimedia player (PMP), an on-vehicle terminal (for example, an on-vehicle navigation terminal) and the like, as well as a fixed terminal such as digital TV, a desktop computer and the like. The electronic device shown in the FIG. 9 is merely an example, and then should not construct any limitation on the function and scope of use of the embodiments of the present disclosure.

As shown in FIG. 9, the electronic device 800 may include a processing apparatus (e.g., a central processing unit, a graphics processor, etc.) 801 that may execute various suitable actions and processings according to the program stored in the read-only memory (ROM) 802 or program loaded from a storage 808 to a random access memory (RAM) 803. The RAM 803 also stores various programs and data required for the operation of the electronic device 800. The processing apparatus 801, the ROM 802, and the RAM 803 are connected to each other through a bus 804. An input/output (I/O) interface 805 is also connected to the bus 804.

In general, the following apparatus may be connected to the I/O interface 805: an input apparatus 806 including, for example, a touch screen, a touch pad, a keyboard, a mouse, a camera, a microphone, an accelerometer, a gyroscope and the like; an output apparatus 807 including, for example, a liquid crystal display (LCD), a speaker, a vibration and the like; a storage 808 including, for example, a magnetic tape and a hard disk and the like; and a communication apparatus 809. The communication apparatus 809 may allow the electronic device 800 to exchange data with other devices by wirelessly or wires communication. Although FIG. 9 illustrates an electronic device 800 having various apparatus, it should be understood that it is not required to implement or have all the illustrated apparatuses. Alternatively, it may include more or less apparatuses.

In particular, the processes described above with reference to the flowcharts may be implemented as a computer software program according to an embodiment of the present disclosure. For example, an embodiment of the present disclosure includes a computer program product comprising a computer program loaded on a computer-readable medium, and the computer program contains program codes for executing the method shown in the flowchart. In such an embodiment, the computer program may be downloaded and installed from the network via the communication apparatus 809, or installed from the storage 808, or installed from the ROM 802. When the computer program is executed by the processing apparatus 801, the above functions defined in the method of the embodiments of the present disclosure are executed.

It should be noted that the above computer-readable medium of the present disclosure may be a computer-readable signal medium or a computer-readable storage medium or any combination of the above two. The computer-readable storage medium may be, for example, but is not limited to, an electronic, magnetic, optical, electromagnetic, infrared, or semiconductor system, apparatus, or device, or any combination of the above. More specific examples of the computer-readable storage media may include, but are not limited to, electrical connections having one or more wires, portable computer disks, hard disks, random access memory (RAM), read-only memory (ROM), erasable and programmable read-only memory (EPROM or flash memory), optical fiber, portable compact disk read-only memory (CD-ROM), optical storage device, magnetic storage device, or any suitable combination of the above. In the present disclosure, a computer-readable storage medium may be any tangible medium that may contain or store programs, which may be used by or in connection with an instruction execution system, apparatus, or device. In the present disclosure, a computer-readable signal medium may include a data signal that is propagated in the baseband or propagated as part of a carrier, carrying computer-readable program codes. Such propagated data signals may take various forms, which includes, but is not limited to, electromagnetic signals, optical signals, or any suitable combination of the above. The computer-readable signal medium may also be any computer-readable medium except for a computer-readable storage medium, and the computer-readable signal medium may transmit, propagate or transport a program for use by or in connection with an instruction execution system, apparatus or device. Program codes contained on the computer-readable medium may be transmitted by any suitable medium, which includes but is not limited to, wire, fiber optic cable, radio frequency (RF), and the like, or any suitable combination of the above.

The above computer-readable medium may be contained in the above electronic device; or may be separately present and is not incorporated in the electronic device.

The computer-readable medium carries one or more programs, when the one or more programs are executed by the electronic device, causing the electronic device to perform the methods according to the foregoing method embodiments; alternatively, the computer-readable medium carries one or more programs, when the one or more programs are executed by the electronic device, causing the electronic device to perform the methods according to the foregoing method embodiments.

Computer program codes for executing the operations of the present disclosure may be written in one or more programming languages, or combinations thereof, wherein the programming languages includes an object-oriented programming language such as Java, Smalltalk, C++, and also includes conventional procedural programming language—such as "C" language or similar programming languages. The program codes may be executed entirely on the user's computer, partly executed on the user's computer, executed as an independent software package, partly executed on the user's computer and partly executed on the remote computer, or entirely executed on the remote computer or on the server. In the case of involving the remote computer, the remote computer may be connected to the user's computer through any kind of network, including a local area network (LAN) or a wide area network (WAN), or may be connected to an external computer (e.g., using an Internet service provider to connect via Internet).

The flowchart and block diagrams in the drawings illustrate the architecture, function, and operation of possible implementations of systems, methods, and computer program products according to various embodiments of the present disclosure. In this regard, each block of the flowchart or block diagram may represent one module, a program segment, or a portion of the codes, and the module, the program segment, or the portion of codes includes one or more executable instructions for implementing the specified logic functions. It should also be noted that in some alternative implementations, the functions noted in the blocks may also occur in an order different from the order noted in the drawings. For example, two successively represented blocks may in fact be executed substantially in parallel, and they may sometimes be executed in the opposite order, depending upon the involved function. It is also noted that each block of the block diagrams and/or flowcharts, and combinations of blocks in the block diagrams and/or flowcharts, may be implemented in a dedicated hardware-based system that executes the specified functions or operations, or it may be implemented by a combination of dedicated hardware and computer instructions.

The above description is only a preferred embodiment of the present disclosure and a description of the principles of the applied technology. It should be understood by those skilled in the art that the disclosure scope of the present disclosure is not limited to the specific technical solutions of the above technical features, and should also cover other technical solutions formed by the random combination of the above technical features or equivalent features thereof without departing from the above disclosed concept, such as a technique solution in which the above features are replaced with technical features having similar functions disclosed (but is not limited) in the present disclosure.

What is claimed is:

1. A video processing method, comprising:
   transmitting a video acquiring request for a video to a server when current display information in a user interaction interface is preview information of the video, wherein the video acquiring request comprises identification information of the video;
   receiving video information corresponding to the video pushed by the server based on the video acquiring request;
   displaying the video information through a video preview window, wherein, the video preview window is suspended above the user interaction interface;
   receiving a video selection operation from the user through the user interaction interface;
   displaying a first display screen corresponding to a first video in response to the video selection operation;
   displaying the video information of the first video through the first display screen;
   wherein when the first video is a first live broadcast video in a first live broadcast room, the video information of the first video is first live broadcast information, the first live broadcast information comprising the first live broadcast video, function configuration information and first interaction information corresponding to the first live broadcast video; and
   wherein the first display screen comprises a first sub-screen and a second sub-screen, the second sub-screen being a transparent screen suspended above the first sub-screen, the first sub-screen displaying the first live broadcast video, the second sub-screen displaying the function configuration information and the first interaction information corresponding to the first live broadcast video.

2. The method according to claim 1, further comprising:
   receiving a video preview operation from a user through the user interaction interface;
   identifying a first display information in the user interaction interface when the video preview operation is completed; and
   determining the first display information as the current display information in the user interaction interface, or determining the display information of file included in the first display information that meets a preset condition, as the current display information in the user interaction interface when the first display information comprises display information of multiple files.

3. The method according to claim 2, wherein, the preset condition comprises:
   a second display information of the file occupies the largest display area in the user interaction interface; or
   a third display information of the file is the display information corresponding to the video, and the third display information of the file occupies the largest display area in the user interaction interface.

4. The method according to claim 1, wherein, the video preview window is suspended above preview information of the video corresponding to the video information.

5. The method according to claim 1, wherein the receiving a video selection operation from the user through the user interaction interface further comprises:
   receiving the video selection operation from the user through the video preview window.

6. The method according to claim 1, wherein the method further comprises:
   receiving a live broadcast room switching operation from the user through the first display screen;
   displaying a second display screen corresponding to a second live broadcast video in a second live broadcast room in response to the live broadcast room switching operation;
   displaying the function configuration information included in the first display screen on a second sub-screen of the second display screen, wherein the second live broadcast room has a same function configuration information as the first live broadcast room;
   acquiring the second live broadcast video and second interaction information corresponding to the second live broadcast video;
   displaying the second live broadcast video on a first sub-screen of the second display screen; and
   displaying the second interactive information corresponding to the second live broadcast video on the second sub-screen of the second display screen.

7. An electronic device, comprising:
   at least one memory, configured to store computer-executable instructions; and
   at least one processor, configured to perform operations on executing the computer-executable instructions, the operations comprising:
   transmitting a video acquiring request for a video to a server when current display information in a user interaction interface is preview information of the video, wherein the video acquiring request comprises identification information of the video;
   receiving video information corresponding to the video pushed by the server based on the video acquiring request;
   displaying the video information through a video preview window, wherein, the video preview window is suspended above the user interaction interface;
   receiving a video selection operation from the user through the user interaction interface;
   displaying a first display screen corresponding to a first video in response to the video selection operation;
   displaying the video information of the first video through the first display screen;

wherein when the first video is a first live broadcast video in a first live broadcast room, the video information of the first video is first live broadcast information, the first live broadcast information comprising the first live broadcast video, function configuration information and first interaction information corresponding to the first live broadcast video; and wherein the first display screen comprises a first sub-screen and a second sub-screen, the second sub-screen being a transparent screen suspended above the first sub-screen, the first sub-screen displaying the first live broadcast video, the second sub-screen displaying the function configuration information and the first interaction information corresponding to the first live broadcast video.

8. The electronic device of claim 7, the operation further comprising:
receiving a video preview operation from a user through the user interaction interface;
identifying a first display information in the user interaction interface when the video preview operation is completed; and
determining the first display information as the current display information in the user interaction interface, or determining the display information of file included in the first display information that meets a preset condition as the current display information in the user interaction interface when the first display information comprises display information of multiple files.

9. The electronic device of claim 7, wherein the receiving a video selection operation from the user through the user interaction interface further comprises receiving the video selection operation from the user through the video preview window.

10. The electronic device of claim 7, the operations further comprising:
receiving an instruction of switching to a second live broadcast room from the user through the first display screen;
displaying a second display screen corresponding to a second live broadcast video in the second live broadcast room in response to receiving the instruction;
displaying the function configuration information included in the first display screen on a second sub-screen of the second display screen, wherein the second live broadcast room has a same function configuration information as the first live broadcast room;
acquiring the second live broadcast video and second interaction information corresponding to the second live broadcast video;
displaying the second live broadcast video on a first sub-screen of the second display screen; and
displaying the second interactive information corresponding to the second live broadcast video on the second sub-screen of the second display screen.

11. A non-transitory computer-readable storage medium, storing computer-readable instructions that upon execution by a computing device cause the computing device to implement operations, the operations comprising:
transmitting a video acquiring request for a video to a server when current display information in a user interaction interface is preview information of the video, wherein the video acquiring request comprises identification information of the video;
receiving video information corresponding to the video pushed by the server based on the video acquiring request;
displaying the video information through a video preview window, wherein, the video preview window is suspended above the user interaction interface;
receiving a video selection operation from the user through the user interaction interface;
displaying a first display screen corresponding to a first video in response to the video selection operation;
displaying the video information of the first video through the first display screen;
wherein when the first video is a first live broadcast video in a first live broadcast room, the video information of the first video is first live broadcast information, the first live broadcast information comprising the first live broadcast video, function configuration information and first interaction information corresponding to the first live broadcast video; and
wherein the first display screen comprises a first sub-screen and a second sub-screen, the second sub-screen being a transparent screen suspended above the first sub-screen, the first sub-screen displaying the first live broadcast video, the second sub-screen displaying the function configuration information and the first interaction information corresponding to the first live broadcast video.

12. The non-transitory computer-readable storage medium of claim 11, the operations further comprising:
receiving a video preview operation from a user through the user interaction interface;
identifying a first display information in the user interaction interface when the video preview operation is completed; and
determining the first display information as the current display information in the user interaction interface, or determining the display information of file included in the first display information that meets a preset condition as the current display information in the user interaction interface when the first display information comprises display information of multiple files.

13. The non-transitory computer-readable storage medium of claim 11, wherein the receiving a video selection operation from the user through the user interaction interface further comprises receiving the video selection operation from the user through the video preview window.

14. The non-transitory computer-readable storage medium of claim 11, the operations further comprising:
receiving an instruction of switching to a second live broadcast room from the user through the first display screen;
displaying a second display screen corresponding to a second live broadcast video in the second live broadcast room in response to receiving the instruction;
displaying the function configuration information included in the first display screen on a second sub-screen of the second display screen, wherein the second live broadcast room has a same function configuration information as the first live broadcast room;
acquiring the second live broadcast video and second interaction information corresponding to the second live broadcast video;
displaying the second live broadcast video on a first sub-screen of the second display screen; and
displaying the second interactive information corresponding to the second live broadcast video on the second sub-screen of the second display screen.

* * * * *